US012807765B2

(12) United States Patent
Son et al.

(10) Patent No.: US 12,807,765 B2
(45) Date of Patent: Nov. 24, 2026

(54) CURABLE COMPOSITION AND TWO-COMPONENT CURABLE COMPOSITION

(71) Applicant: LG Energy Solution, Ltd., Seoul (KR)

(72) Inventors: Ho Yeon Son, Daejeon (KR); Han Nah Jeong, Daejeon (KR); Shin Hee Jun, Daejeon (KR); Ha Na Lee, Daejeon (KR); Tae Hee Kim, Daejeon (KR); Yang Gu Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 697 days.

(21) Appl. No.: 18/013,119

(22) PCT Filed: Sep. 28, 2021

(86) PCT No.: PCT/KR2021/013166

§ 371 (c)(1),
(2) Date: Dec. 27, 2022

(87) PCT Pub. No.: WO2022/071707

PCT Pub. Date: Apr. 7, 2022

(65) Prior Publication Data

US 2023/0242713 A1 Aug. 3, 2023

(30) Foreign Application Priority Data

Sep. 29, 2020 (KR) ........................ 10-2020-0127591
Sep. 17, 2021 (KR) ........................ 10-2021-0124663

(51) Int. Cl.

*C08G 77/20* (2006.01)
*C08G 77/08* (2006.01)

(Continued)

(52) U.S. Cl.

CPC ............ *C08G 77/20* (2013.01); *C08G 77/08* (2013.01); *C08G 77/12* (2013.01); *C08K 3/22* (2013.01);

(Continued)

(58) Field of Classification Search

None

See application file for complete search history.

(56) References Cited

U.S. PATENT DOCUMENTS 4,604,424 A 8/1986 Cole et al.
6,313,190 B1 11/2001 Bublewitz et al.

(Continued)

FOREIGN PATENT DOCUMENTS

CA 2314264 A1 4/2000
CN 1282354 A 1/2001

(Continued)

OTHER PUBLICATIONS

English Machine Translation of EP 1037946 B1 (Year: 2025).*

(Continued)

*Primary Examiner* — Randy P Gulakowski
*Assistant Examiner* — Holly Grace Hester
(74) *Attorney, Agent, or Firm* — Lerner David LLP

(57) ABSTRACT

The present application can provide a curable composition comprising an alkenyl group-containing polyorganosiloxane component; a silicon-bonded hydrogen-containing polyorganosiloxane component; and a filler component having a filler having a hydroxyl group on the surface, which has excellent storage stability due to no change in physical properties such as viscosity or hardness during storage, and a two-component curable composition comprising such a curable composition. In addition, the present application can provide a curable composition having excellent storage stability without using a separate additive or without any (Continued)

surface treatment process of a thermally conductive filler, and a two-component curable composition comprising such a curable composition.

12 Claims, 1 Drawing Sheet

(51) Int. Cl.
*C08G 77/12* (2006.01)
*C08K 3/22* (2006.01)

(52) U.S. Cl.
CPC .. *C08K 2201/003* (2013.01); *C08K 2201/014* (2013.01)

(56) References Cited

U.S. PATENT DOCUMENTS

| | | | | |
|---|---|---|---|---|
| 2008/0139731 | A1 | 6/2008 | Lawson et al. | |
| 2008/0153956 | A1 | 6/2008 | Hara | |
| 2012/0123054 | A1* | 5/2012 | Matsumoto | C08K 3/22 524/786 |
| 2013/0330562 | A1 | 12/2013 | Irifune et al. | |
| 2016/0086713 | A1* | 3/2016 | Iwata | H01F 27/08 252/78.3 |
| 2016/0096984 | A1 | 4/2016 | Matsumoto | |
| 2017/0327713 | A1 | 11/2017 | Steinmann et al. | |
| 2019/0359872 | A1 | 11/2019 | Yoo et al. | |
| 2020/0181408 | A1* | 6/2020 | Beyer | C08K 5/56 |
| 2020/0270499 | A1 | 8/2020 | Ota et al. | |
| 2021/0130561 | A1 | 5/2021 | Endo et al. | |
| 2021/0355363 | A1 | 11/2021 | Tsukada et al. | |
| 2021/0371660 | A1 | 12/2021 | Ishida et al. | |

FOREIGN PATENT DOCUMENTS

| | | | | |
|---|---|---|---|---|
| CN | 102029752 | A | 4/2011 | |
| CN | 103342896 | A | 10/2013 | |
| CN | 107109126 | A | 8/2017 | |
| CN | 111051434 | A | 4/2020 | |
| EP | 0263039 | A1 | 4/1988 | |
| EP | 0894117 | A1 | 2/1999 | |
| EP | 2308676 | A1 | 4/2011 | |
| JP | 2008156545 | A | 7/2008 | |
| JP | 2010144130 | A | 7/2010 | |
| JP | 2011089079 | A | 5/2011 | |
| JP | 2011098566 | A | 5/2011 | |
| JP | 2011178821 | A | 9/2011 | |
| JP | 2011231228 | A | 11/2011 | |
| JP | 2013253176 | A | 12/2013 | |
| JP | 2014118484 | A | 6/2014 | |
| JP | 2016084378 | A | 5/2016 | |
| JP | 2020029524 | A | 2/2020 | |
| JP | 2020063365 | A | 4/2020 | |
| JP | 2020066713 | A | 4/2020 | |
| KR | 950006643 | B1 | 6/1995 | |
| KR | 20010033007 | A | 4/2001 | |
| KR | 20080021673 | A | 3/2008 | |
| KR | 20160006689 | A | 1/2016 | |
| KR | 101864534 | B1 | 6/2018 | |
| KR | 102024524 | B1 | 10/2019 | |
| KR | 20190112023 | A | 10/2019 | |
| WO | 2014098204 | A1 | 6/2014 | |
| WO | WO-2019021826 | A1 * | 1/2019 | H01M 10/6551 |
| WO | 2020095902 | A1 | 5/2020 | |

OTHER PUBLICATIONS

Peri et al (Year: 1960).*
Cao et al (Year: 2020).*
Extended European Search Report including Written Opinion for Application No. 21875982.7 dated Jan. 16, 2024, pp. 1-7.
Kcc: "KCC Brochure Silicones", Oct. 24, 2019 (Oct. 24, 2019), pp. 1-31, XP093114626, Retrieved from the Internet: URL:https://www.kccsilicone.com/upload/KCC_Brochure_Silicone.pdf.
Laiguoqiao, X. "Synthesis Process and Application of Silicone Products" Chemical Industry Press, Jan. 2010, 6 pages. [Partial English translation of p. 647 paragraph 3 attached].
Search Report dated Feb. 29, 2024 from the Office Action for Chinese Application No. 202180044280.4 issued Mar. 1, 2024, 2 pages.
International Search Report for Application No. PCT/KR2021/013166 mailed Jan. 17, 2022, pp. 1-3.
Lagauche, M., et al: "Thermodynamic Characterization of the Hydroxyl Group on the y-Alumina Surface by the Energy Distribution Function", The Journal of Physical Chemistry C, ACS Publications, Jul. 2017, pp. 16770-16782, vol. 121, No. 31.
Communication pursuant to Article 94(3) EPC, for European Application No. 21875982.7, dated Nov. 18, 2025, 6 pages.

* cited by examiner

[FIGURE]
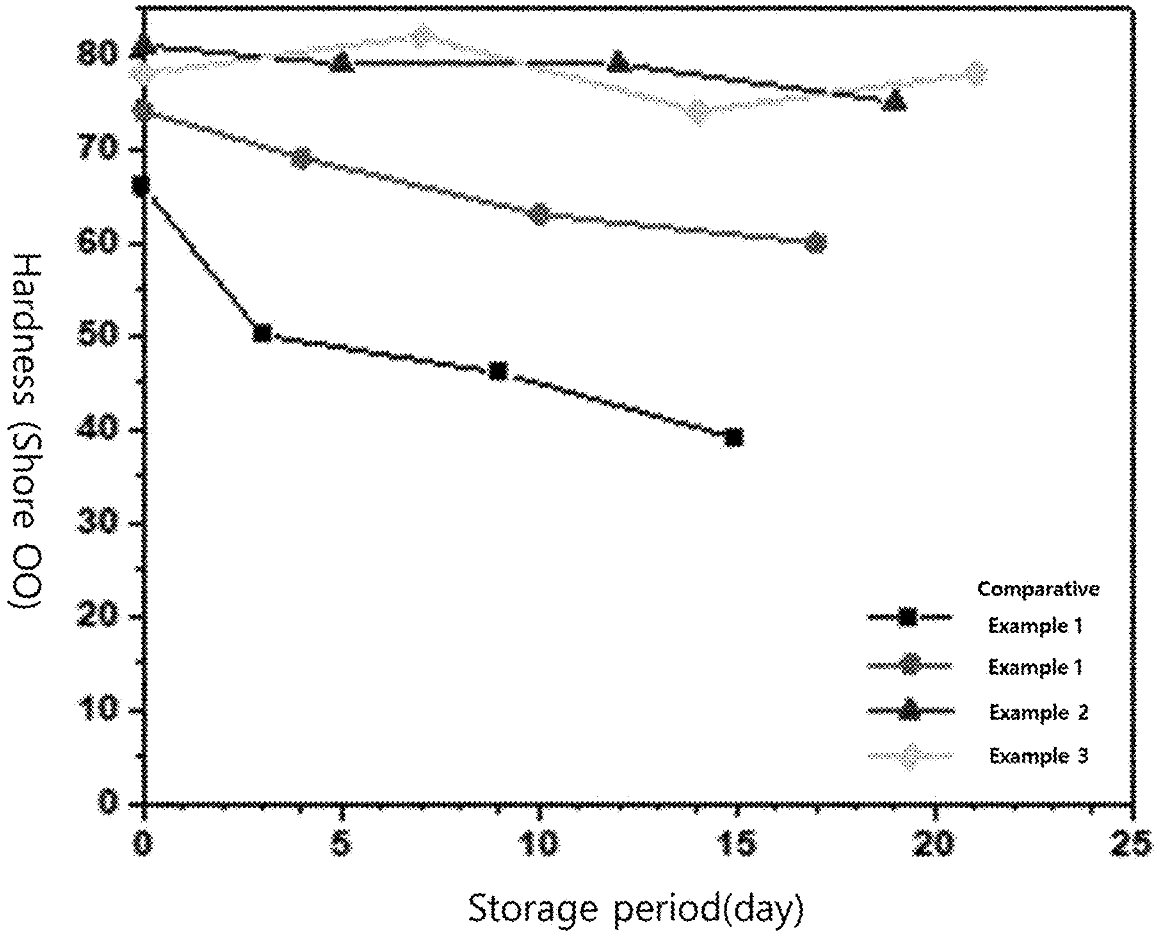

CURABLE COMPOSITION AND TWO-COMPONENT CURABLE COMPOSITION

CROSS-CITATION WITH RELATED APPLICATIONS

The present application is a national stage entry under 35 U.S.C. § 371 of International Application No. PCT/KR2021/013166 filed on Sep. 28, 2021, which claims priority from Korean Patent Applications No. 10-2020-0127591 filed on Sep. 29, 2020, and No. 10-2021-0124663 filed on Sep. 17, 2021, all the disclosures of which are incorporated herein by reference.

TECHNICAL FIELD

The present disclosure is related to a curable composition and a two-component curable composition.

BACKGROUND ART

Heat dissipation materials are used in various fields. Taking a vehicle as an example, the heat dissipation material may be used to process heat generated from a battery module built in an electric vehicle capable of charging and discharging, an on-board charger (OBC) for charging the battery, and the like, and the heat dissipation material is also applied to parts that consume high power and generate a lot of heat, such as LED modules, so that the lifespan of the LED modules can be improved.

A silicone-based resin composition has excellent heat resistance, whereby it can be used as a heat dissipation material. An inorganic hydroxide filler may be added to such a silicone-based resin composition to implement excellent heat conduction performance.

However, if the inorganic hydroxide filler is used without surface treatment, the highly reactive inorganic hydroxide filler reacts with a curing agent and the like in the resin composition, where the viscosity and hardness of the resin composition or cured product vary from the designed ranges over time, whereby there may be a problem that long-term storage stability is deteriorated.

To solve such a problem, there is a method of surface-treating an inorganic hydroxide filler to mix it with a silicone-based resin composition, but this method takes a lot of time and money, so that there is also a need for a method capable of securing long-term storage stability of the resin composition without surface treatment of the filler.

DISCLOSURE

Technical Problem

The present application is intended to provide a curable composition having excellent storage stability due to no change in physical properties such as viscosity or hardness during storage, and a two-component curable composition comprising such a curable composition.

In addition, the present application is intended to provide a curable composition having excellent storage stability without using a separate additive or without any surface treatment process of a thermally conductive filler, and a two-component curable composition comprising such a curable composition.

Technical Solution

Among physical properties mentioned in this specification, the physical property in which the measured temperature affects the physical property is a physical property measured at room temperature unless otherwise specified.

In this specification, the term room temperature is a natural temperature without heating and cooling, which means, for example, any one temperature within a range of about 10 °C to 30 °C, such as a temperature of about 15 °C, about 18 °C, about 20 °C, about 23 °C or about 25 °C or so. Also, in this specification, the unit of temperature is °C unless otherwise specified.

In this specification, the term alkenyl group may mean a linear, branched or cyclic alkenyl group with 2 to 20 carbon atoms, 2 to 16 carbon atoms, 2 to 12 carbon atoms, 2 to 8 carbon atoms or 2 to 4 carbon atoms, unless otherwise specified In this specification, the term alkyl group or alkoxy group may mean a linear, branched or cyclic alkyl group or alkoxy group with 1 to 20 carbon atoms, 1 to 16 carbon atoms, 1 to 12 carbon atoms, 1 to 8 carbon atoms or 1 to 4 carbon atoms, unless otherwise specified.

In this specification, the term aryl group may mean a monovalent residue derived from a compound containing a benzene structure, a compound containing a structure in which two or more benzenes are connected by a linker or a compound containing a structure that two benzenes are condensed or bonded while they each share one or two carbon atoms, or a derivative of any one of the above-mentioned compounds, unless otherwise specified. In the range of the aryl group as mentioned herein, a so-called aralkyl group or arylalkyl group as well as a functional group commonly referred to as an aryl group may also be included. The aryl group may be, for example, an aryl group with 6 to 25 carbon atoms, 6 to 21 carbon atoms, 6 to 18 carbon atoms or 6 to 12 carbon atoms. The aryl group may be exemplified by a phenyl group, a dichlorophenyl group, a chlorophenyl group, a phenylethyl group, a phenylpropyl group, a benzyl group, a tolyl group, a xylyl group or a naphthyl group, and the like.

The alkenyl group, alkoxy group, alkyl group or aryl group, and the like may be optionally substituted with one or more substituents. At this time, the substituent may be exemplified by halogen such as chlorine or fluorine, an epoxy group such as a glycidyl group, an epoxyalkyl group, a glycidoxyalkyl group or an alicyclic epoxy group, an acryloyl group, a methacryloyl group, an isocyanate group, a thiol group or a monovalent hydrocarbon group, and the like, but is not limited thereto.

In this specification, the term M unit may mean a so-called monofunctional siloxane unit which may be usually represented by ($R_3SiO_{1/2}$); the term D unit may mean a so-called bifunctional siloxane unit which may be usually represented by ($R_2SiO_{2/2}$); the term T unit may mean a so-called trifunctional siloxane unit which may be usually represented by ($RSiO_{3/2}$); and the term Q unit may mean a so-called tetrafunctional siloxane unit which may be usually represented by ($SiO_{4/2}$). In the formula of each siloxane unit, each R is a functional group bonded to silicon (Si), which may be, for example, hydrogen, an alkyl group, an alkenyl group, an aryl group, an alkoxy group or an epoxy group, and the like.

The curable composition of the present application may comprise an alkenyl group-containing polyorganosiloxane component, a silicon-bonded hydrogen-containing polyorganosiloxane component, and a filler component having a filler with a hydroxyl group on its surface. The curable composition of the present application is cured by a reaction (addition reaction (hydrosilylation reaction product)) of the alkenyl group of the alkenyl group-containing polyorganosiloxane component with the hydrogen of the silicon-bonded hydrogen-containing polyorganosiloxane component.

In one example, the curable composition may be a one-component resin composition, a main composition of a two-component resin composition, a curing agent composition of a two-component resin composition, or a mixture of main and curing agent compositions of a two-component resin composition. The one-component resin composition is a resin composition in which the curable components are stored in a mixed state, and the two-component resin composition is a resin composition in which the curable components are separated into a main composition and a curing agent composition as physically separated, and stored. In the case of the two-component resin composition, the main and curing agent compositions are mixed under conditions in which curing can occur at the time of use.

In this specification, the term polyorganosiloxane component may be a mixture of polyorganosiloxanes and/or a mixture of polyorganosiloxanes and siloxane monomers. In a more specific example, the polyorganosiloxane component may be a resultant product of a polymerization reaction performed to obtain a specifically desired polyorganosiloxane or a mixture of two or more resultant products of the polymerization reaction.

As the alkenyl group-containing polyorganosiloxane component in the curable composition, a known polyorganosiloxane component may be used without any particular limitation. In one example, as the polyorganosiloxane component, a polyorganosiloxane component including a linear polyorganosiloxane may be used.

The linear polyorganosiloxane is a polyorganosiloxane having a structure in which both ends of a chain structure composed of D units are blocked by M units as is known.

The linear polyorganosiloxane is a polyorganosiloxane having a structure in which both ends of a chain structure composed of D units are blocked by M units.

In the above structure, various types of units may be used as the D unit. For example, as the D unit, at least one unit selected from the group consisting of a so-called dialkylsiloxane unit (bifunctional siloxane unit wherein both Rs are alkyl groups in the $R_2SiO_{2/2}$ structure), a diarylsiloxane unit (bifunctional siloxane unit wherein both Rs are aryl groups in the $R_2SiO_{2/2}$ structure), a dialkenylsiloxane unit (bifunctional siloxane unit wherein both Rs are alkenyl groups in the $R_2SiO_{2/2}$ structure), an alkylarylsiloxane unit (bifunctional siloxane unit wherein one R is an alkyl group and the other R is an aryl group in the $R_2SiO_{2/2}$ structure) unit), an alkylalkenylsiloxane unit (bifunctional siloxane unit wherein one R is an alkyl group and the other R is an alkenyl group in the $R_2SiO_{2/2}$ structure) and an arylalkenylsiloxane unit (bifunctional siloxane unit wherein one R is an alkenyl group and the other R is an aryl group in the $R_2SiO_{2/2}$ structure) may be applied.

The suitable D unit may be exemplified by a dialkylsiloxane unit (bifunctional siloxane unit wherein both Rs are alkyl groups in the $R_2SiO_{2/2}$ structure) and/or an alkylalkenylsiloxane unit (bifunctional siloxane unit wherein one R is an alkyl group and the other R is an alkenyl group in the $R_2SiO_{2/2}$ structure).

In the linear polyorganosiloxane structure, the M unit at both ends of the chain structure consisting of D units may be exemplified by, for example, an alkenyldialkylsiloxane unit (monofunctional siloxane unit wherein one R is an alkenyl group and the other two are alkyl groups in the $R_3SiO_{2/2}$ structure) and/or a trialkylsiloxane unit (monofunctional siloxane unit wherein all Rs are alkyl groups in the $R_3SiO_{1/2}$ structure), and the like. For example, in the case of a structure in which both ends are terminated with alkenyl groups, as the M unit, an alkenyldialkyl siloxane unit may be used.

In one example, as the polyorganosiloxane having an alkenyl group, a polyorganosiloxane in which the D unit of the main chain structure of the linear polyorganosiloxane is a dialkylsiloxane unit (bifunctional siloxane unit wherein both Rs are alkyl groups in the $R_2SiO_{2/2}$ structure) and/or an alkylalkenylsiloxane unit (bifunctional siloxane unit wherein one R is an alkyl group and the other R is an alkenyl group in the $R_2SiO_{2/2}$ structure), and the M unit at both ends is an alkenyldialkylsiloxane unit (monofunctional siloxane unit wherein one R is an alkenyl group and the other two are alkyl groups in the $R_3SiO_{2/2}$ structure) may be used.

When two or more D units are used as the D unit of the main chain, the main chain shape may be a main chain shape of a random copolymer, a block copolymer or a gradient copolymer.

In one example, as the polyorganosiloxane component, a component represented by the following average unit formula A may be used.

When the total mole number of all siloxane units (M, D, T and Q units) present in the polyorganosiloxane component has been converted to 1, the term average unit formula is a unit formula indicating the mole ratio of each present siloxane unit.

$$(R^1R^2_2SiO_{1/2})_a(R^2_3SiO_{1/2})_b(R^1R^2SiO_{2/2})_c(R^2_2SiO_{2/2})_d$$ [Average Unit Formula A]

In Average Unit Formula A, $R^1$ is an alkenyl group, $R^2$ is an alkyl group or an aryl group, a+b+c+d is 1, (a+b) is a number in a range of 0.001 to 0.05, (c+d) is a number in a range of 0.95 to 0.999, and b/a and c/d are each independently a number in a range of 0 to 10.

In Average Unit Formula A, (a+b) may be, in another example, 0.007 or more, or 0.009 or more, or may also be 0.045 or less, 0.04 or less, 0.035 or less, 0.03 or less, 0.025 or less, 0.02 or less, or 0.015 or less or so.

In Average Unit Formula A, (c+d) may be, in another example, 0.75 or more, 0.8 or more, 0.85 or more, 0.9 or more, or 0.95 or more, or may also be 0.997 or less, 0.995 or less, 0.993 or less, or 0.991 or less or so.

In Average Unit Formula A, b/a may be, in another example, 0 to 9, 0 to 8, 0 to 7, 0 to 6, 0 to 5, 0 to 4, 0 to 3, 0 to 2, 0 to 1 or 0 to 0.5 or so, or may be 0.

In Average Unit Formula A, c/d may be, in another example, 0 to 9, 0 to 8, 0 to 7, 0 to 6, 0 to 5, 0 to 4, 0 to 3, 0 to 2, 0 to 1 or 0 to 0.5 or so, or may be 0.

In one example, the alkenyl group-containing polyorganosiloxane component may comprise a polyorganosiloxane represented by Formula 1 below.

[Formula 1]

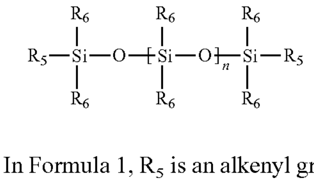

In Formula 1, $R_5$ is an alkenyl group, $R_6$ is an alkyl group or an aryl group, and n is a number in a range of 30 to 300. In Formula 1, n may be, in another example, 40 or more, 50 or more, 60 or more, 70 or more, 80 or more, 90 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, or 250 or more, or may be 290 or less, 280 or less, 270 or less, 260 or less, 250 or less, 240 or less, 230 or less, 220 or less, 210 or less, 200 or less, 190 or less, 180 or less, 170 or less, 160 or less, 150 or less, 140 or less, 130 or less, 120 or less, 110 or less, or 100 or less or so.

In the definition of Formula 1 above, specific types of as an alkenyl group, an alkyl group and an aryl group, and the like are the same as those described in the introduction of Technical Solution of this specification.

The alkenyl group-containing polyorganosiloxane component may comprise an alkenyl group in an amount of about 0.05 to 5 mmol/g. In another example, the ratio of the alkenyl group may be about 0.1 mmol/g or more, 0.15 mmol/g or more, 0.2 mmol/g or more, or 0.25 mmol/g or more, or may be 4 mmol/g or less, 3 mmol/g or less, 2 mmol/g or less, 1 mmol/g or less, 0.5 mmol/g or less, or 0.3 mmol/g or less or so. The above ratio is a value obtained by calculating the alkenyl group ratio of the alkenyl group-containing polyorganosiloxane component in the liquid curing agent composition excluding the filler component.

The alkenyl group ratio may be changed according to the specific use of the curable composition, and when it satisfies the prescribed range, it is possible to secure a desired viscosity as it is mixed with a filler component.

For example, when the curable composition is a curing agent composition of a two-component curable composition, the alkenyl group ratio may be further about 0.1 mmol/g or more, 0.15 mmol/g or more, 0.2 mmol/g or more, or 0.25 mmol/g or more within the above range, or may be 4 mmol/g or less, 3 mmol/g or less, 2 mmol/g or less, 1 mmol/g or less, 0.5 mmol/g or less, or 0.3 mmol/g or less or so.

In another example, when the curable composition is a mixture of main and curing agent compositions of the two-component curable composition or a one-component curable composition, the alkenyl group ratio in the above range may be further adjusted in the range of 0.1 mmol/g or more, 0.15 mmol/g or more, 0.2 mmol/g or more, 0.25 mmol/g or more, 0.3 mmol/g or more, or 0.35 mmol/g or more and/or in the range of 4.5 mmol/g or less, or 4 mmol/g or less.

The alkenyl group content and the silicon-bonded hydrogen content of the polyorganosiloxane component mentioned in this specification are values obtained through $^{1}H$ NMR and/or $^{29}Si$ NMR analysis described in Examples which are described below for the polyorganosiloxane component. This method is different from the value theoretically obtained through the chemical formula of the polyorganosiloxane included in the polyorganosiloxane component. That is, various types of polyorganosiloxanes belonging to the same category of chemical formula but having different detailed structures may exist within the polyorganosiloxane component (for example, in the structure of Formula 1 above, a plurality of polyorganosiloxanes having different n values may be present), so that the exact ratio between the curable functional groups (the ratio of alkenyl groups and silicon-bonded hydrogens) cannot be identified in this way.

The ratio plays an important role in securing desired storage stability (suppression of changes in viscosity and hardness over time) and thixotropy, and the like, which should be determined based on the $^{1}H$ NMR and/or $^{29}Si$ NMR analysis results.

In one example, the polyorganosiloxane having an alkenyl group may have a number average molecular weight (Mn) in a range of 2500 g/mol to 20000 g/mol. In another example, the number average molecular weight (Mn) of the polyorganosiloxane having an alkenyl group may be 3000 g/mol or more, 3500 g/mol or more, 4000 g/mol or more, 4500 g/mol or more, 5000 g/mol or more, or 5500 g/mol or more, or may be 19000 g/mol or less, 18000 g/mol or less, 17000 g/mol or less, 16000 g/mol or less, 15000 g/mol or less, or 14000 g/mol or less or so.

Also, as the silicon-bonded hydrogen-containing polyorganosiloxane component in the curable composition, a known material may be used without particular limitation. For example, as the polyorganosiloxane component, a linear polyorganosiloxane, that is, a polyorganosiloxane having a structure in which both ends of a chain structure consisting of D units are blocked by M units may be used.

In the above structure, various types of units may be used as the D unit. For example, as the D unit, at least one unit selected from the group consisting of a so-called dialkylsiloxane unit (bifunctional siloxane unit where both Rs are alkyl groups in the $R_2SiO_{2/2}$ structure), diarylsiloxane unit (bifunctional siloxane unit wherein both Rs are aryl groups in the $R_2SiO_{2/2}$ structure), dihydrogensiloxane unit (bifunctional siloxane unit wherein both Rs are hydrogen in the $R_2SiO_{2/2}$ structure), alkylarylsiloxane unit (bifunctional siloxane wherein one R is an alkyl group and the other R is an aryl group in the $R_2SiO_{2/2}$ structure), alkylhydrogensiloxane unit (bifunctional siloxane unit wherein one R is an alkyl group and the other R is hydrogen in the $R_2SiO_{2/2}$ structure) and arylhydrogensiloxane unit (bifunctional siloxane unit wherein one R is hydrogen and the other R is an aryl group in the $R_2SiO_{2/2}$ structure) may be applied.

The suitable D unit may be exemplified by, among the foregoing, a dialkylsiloxane unit (bifunctional siloxane unit wherein both Rs are alkyl groups in the $R_2SiO_{2/2}$ structure) and/or an alkylhydrogensiloxane unit (bifunctional siloxane unit wherein one R is an alkyl group and the other R is hydrogen in the $R_2SiO_{2/2}$ structure).

In the structure of the linear polyorganosiloxane, the M unit at both ends of the chain structure consisting of D units may be exemplified by, for example, a hydrogendialkylsiloxane unit (monofunctional siloxane unit wherein one R is hydrogen and the other two are alkyl groups in the $R_3SiO_{1/2}$ structure) and/or a trialkylsiloxane unit (monofunctional siloxane unit wherein all Rs are alkyl groups in the $R_3SiO_{1/2}$ structure), and the like. For example, in the case of a structure in which both ends are terminated with the silicon-bonded hydrogen, a hydrogendialkyl siloxane unit may be used as the M unit.

In one example, as the silicon-bonded hydrogen-containing polyorganosiloxane component, a component represented by the following average unit formula B may be used.

$$(HR^3_2SiO_{1/21})_a(R^3_3SiO_{1/2})_b(R^3_2SiO_{2/2})_c(HR^3SiO_{2/2})_d \quad \text{[Average Unit Formula B]}$$

In Average Unit Formula B, $R^3$ may be an alkyl group or an aryl group, a+b+c+d may be 1, a may be a number in a range of 0.001 to 0.2, b may be a number in a range of 0.01 to 0.8, c may be a number in a range of 0.01 to 0.7, and d may be a number in a range of 0.001 to 0.4.

In another example, a may be in the range of 0.003 or more, 0.005 or more, 0.007 or more, 0.009 or more, 0.01 or more, 0.03 or more, 0.05 or more, 0.07 or more, or 0.085 or more, or may also be in the range of 0.15 or less, or 0.1 or less.

In another example, b may be 0.05 or more, 0.1 or more, 0.15 or more, 0.2 or more, 0.25 or more, 0.3 or more, 0.35 or more, or 0.4 or more, or may also be a number in the range of 0.7 or less, 0.6 or less, 0.5 or less, or 0.45 or less.

In another example, c may be a number in the range of 0.05 or more, 0.1 or more, 0.15 or more, 0.2 or more, 0.25 or more, or 0.3 or more, or may also be a number in the range of 0.65 or less, 0.6 or less, 0.55 or less, 0.5 or less, 0.45 or less, 0.4 or less, or 0.35 or less.

In another example, d may be in the range of 0.003 or more, 0.005 or more, 0.007 or more, 0.009 or more, 0.01 or more, 0.03 or more, 0.05 or more, 0.07 or more, 0.09 or more, 0.11 or more, or 0.13 or more, or may be a number in the range of 0.35 or less, 0.3 or less, 0.25 or less, or 0.2 or less. In one example, the silicon-bonded hydrogen-containing polyorganosiloxane component may comprise a first polyorganosiloxane component including the polyorganosiloxane of Formula 2 below and a second polyorganosiloxane component including the polyorganosiloxane of Formula 3.

[Formula 2]

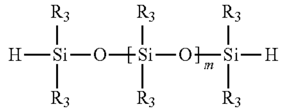

In Formula 2, $R_3$ is an alkyl group or an aryl group, and m is a number in a range of 4 to 25. In Formula 2, m may be, in another example, 5 or more, 6 or more, 7 or more, 8 or more, 9 or more, 10 or more, 11 or more, 12 or more, 13 or more, or 14 or more, or may be 23 or less, 21 or less, 19 or less, 17 or less, 15 or less, 13 or less, 11 or less, or 9 or less or so.

[Formula 3]

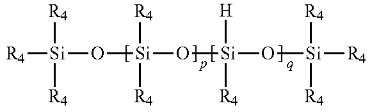

In Formula 3, $R_4$ is an alkyl group or an aryl group, p is a number in a range of 20 to 60, and q is a number in a range of 3 to 20. In Formula 3, p may be, in another example, 21 or more, 22 or more, 23 or more, 24 or more, 25 or more, 26 or more, 27 or more, 28 or more, 29 or more, or 30 or more, or may be 55 or less, 50 or less, 45 or less, or 40 or less or so. In addition, in Formula 3, q may be, in another example, 4 or more, 6 or more, 7.5 or more, 9 or more, or 11 or more, or may also be 18 or less, 17 or less, 16 or less, 15 or less, or 14 or less or so.

Specific types of the alkyl group and the aryl group in Formula 2 or Formula 3 are the same as those described in the introduction of Technical Solution of this specification.

The mole number of silicon-bonded hydrogen contained in the first polyorganosiloxane component may be 0.5 to 10 mmol/g. In another example, the first polyorganosiloxane component may comprise the silicon-bonded hydrogen in an amount of 1.2 mmol/g or more, 1.4 mmol/g or more, 1.6 mmol/g or more, 1.8 mmol/g or more, 2 mmol/g or more, 2.2 mmol/g or more, 2.4 mmol/g or more, or 2.6 mmol/g or more, or in an amount of 9 mmol/g or less, 8 mmol/g or less, 7 mmol/g or less, 6 mmol/g or less, 5 mmol/g or less, or 4 mmol/g or less.

The mole number of silicon-bonded hydrogen contained in the second polyorganosiloxane component may be 0.5 to 6 mmol/g. In another example, the second polyorganosiloxane component may comprise the silicon-bonded hydrogen in an amount of 1 mmol/g or more, 2 mmol/g or more, 3 mmol/g or more, or 4 mmol/g or more, or also in an amount of 5.5 mmol/g or less, 5 mmol/g or less, or 4.5 mmol/g or less.

In one example, when the silicon-bonded hydrogen-containing polyorganosiloxane component comprises: the first polyorganosiloxane component; and the second polyorganosiloxane component, the ratio (H1/H2) of the mole number (H1) of silicon-bonded hydrogen in the first polyorganosiloxane component to the mole number (H2) of silicon-bonded hydrogens in the second polyorganosiloxane component may be in the range of 0.5 to 10.

In another example, the ratio (H1/H2) may be 1 or more, 1.5 or more, 2 or more, 2.5 or more, 3 or more, 3.5 or more, or 4 or more, or may also be 9 or less, 8 or less, 7 or less, 6 or less, 5 or less, or 4.5 or less or so.

In the curable composition, the ratio (H/Ak) of the mole number (H) of silicon-bonded hydrogens in the silicon-bonded hydrogen-containing polyorganosiloxane component to the mole number (Ak) of alkenyl groups in the alkenyl group-containing polyorganosiloxane component may be adjusted in a range of 2 to 10. In another example, the range may be 2.1 or more, 2.2 or more, 2.3 or more, 2.4 or more, 2.5 or more, 2.6 or more, 2.7 or more, or 2.8 or more, or may be adjusted in 9 or less, 8 or less, or 7 or less or so.

The ratio may be changed according to the specific use of the curable composition.

For example, when the curable composition is a curing agent composition of a two-component curable composition, the ratio in the above range may be further adjusted in the range of 3 or more, 3.5 or more, 4 or more, 4.5 or more, 5 or more, 5.5 or more, or 6 or more and/or in the range of 9 or less, 8.5 or less, 8 or less, 7.5 or less, or 7 or less.

In another example, when the curable composition is a mixed composition of main and curing agent compositions of a two-component curable composition, or is a one-component composition, the ratio in the above range may be further adjusted in the range of 2.2 or more, 2.4 or more, 2.6 or more, or 2.8 or more and/or in the range of 9 or less, 8 or less, 7 or less, 6 or less, 5 or less, 4 or less, or 3 or less.

When a thermally conductive filler is applied as a filler in the curable composition, it is possible to secure heat dissipation or thermal conductivity of the curable composition or a cured product thereof.

The thermally conductive filler is a filler that allows the curable composition, to which the filler is applied, to form a cured product exhibiting a thermal conductivity of about 1 W/mK or more. The thermal conductivity of the cured product may be about 1.2 W/mK or more, 1.4 W/mK or more, 1.6 W/mK or more, or 1.8 W/mK or more, or may be about 400 W/mK or less, about 350 W/mK or less, about 300 W/mK or less, 200 W/mK or less, 100 W/mK or less, 50 W/mK or less, 10 W/mK or less, 8 W/mK or less, 6 W/mK or less, 4 W/mK or less, or 2 W/mK or less or so.

The filler component of the present application may have a filler having a hydroxyl group on the surface. In one example, the filler may be one or more selected from the group consisting of aluminum hydroxide ($Al(OH)_3$), magnesium hydroxide ($Mg(OH)_2$), calcium hydroxide ($Ca(OH)_2$) and hydromagnesite ($Mg_5(CO_3)_4(OH)_2 \cdot 4H_2O$). These fillers have excellent thermal conductivity and low specific gravity, thereby being advantageous for weight reduction. There is no particular limitation on the shape of the applicable filler, where for example, a spherical filler, a filler in a form such as a needle shape or a plate shape or other amorphous fillers may also be used.

In one example, the filler having a hydroxyl group on the surface may have an average particle diameter in a range of 0.001 μm to 100 μm. The average particle diameter is a D50 particle diameter measured by the method described in Examples to be described below. In another example, the average particle diameter of the filler may be 0.005 μm or more, 0.01 μm or more, 0.05 μm or more, 0.1 μm or more, 0.5 μm or more, 0.8 μm or more, 1 μm or more, 5 μm or more, 10 μm or more, 15 μm or more, 20 μm or more, 25 μm or more, 30 μm or more, 35 μm or more, 40 μm or more, or 45 μm or more, or may also be 95 μm or less, 90 μm or less, 85 μm or less, 80 μm or less, 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or 5 μm or less or so.

For securing appropriate filling properties and securing desired physical properties, a mixture of two or more fillers having at least different average particle diameters may be used as the filler. For example, as the filler, a first filler having an average particle diameter of 20 μm or more and a second filler having an average particle diameter of 10 μm or less within the aforementioned range may also be used.

In another example, the average particle diameter of the first filler may be 25 μm or more, 30 μm or more, 35 μm or more, 40 μm or more, or 45 μm or more, or may be 100 or less, 95 μm or less, 90 μm or less, 85 μm or less, 80 μm or less, 75 μm or less, 70 μm or less, 65 μm or less, 60 μm or less, or 55 μm or less or so.

Also, in another example, the average particle diameter of the second filler may be 0.001 μm or more, 0.005 μm or more, 0.01 μm or more, 0.05 μM or more, 0.1 μm or more, 0.5 μm or more, or 0.8 μm or more, or may also be 10 μm or less, 8 μm or less, 6 μm or less, 4 μm or less, or 3 μm or less or so.

When the first and second fillers are simultaneously applied, the ratio (D1/D2) of the average particle diameter (D1) of the first filler to the average particle diameter (D2) of the second filler may be in a range of 2 to 200. In another example, the ratio (D1/D2) may be 5 or more, 10 or more, 15 or more, 20 or more, 25 or more, 30 or more, 35 or more, 40 or more, or 45 or more, or may also be 170 or less, 150 or less, 130 or less, 110 or less, 95 or less, 90 or less, 85 or less, 80 or less, 75 or less, 70 or less, 65 or less, 60 or less, or 55 or less or so.

When the first and second fillers are simultaneously applied, the ratio (W1/W2) of the used weight (W1) of the first filler to the used weight (W2) of the second filler may be in a range of 0.5 to 10. In another example, the ratio (W1/W2) may be 1 or more, 1.5 or more, or 2 or more, or may be 9 or less, 8 or less, 7 or less, 6 or less, 5 or less, 4 or less, or 3 or less or so.

The filler component may be included in a range of 200 to 900 parts by weight relative to 100 parts by weight of the alkenyl group-containing polyorganosiloxane component of the curable composition. In addition, the filler component may be included in a range of 1,000 to 30,000 parts by weight relative to 100 parts by weight of the silicon-bonded hydrogen-containing polyorganosiloxane component of the curable composition.

When the above range is satisfied, it is possible to secure long-term storage stability of the curable composition while securing excellent heat dissipation properties and simultaneously improving attachment force between metal and the curable composition.

In one example, the filler component may be included in an amount of 50 to 75 vol % based on the total volume of the curable composition. The volume ratio can be calculated in consideration of the mass ratios of the respective components included in the curing agent composition and their densities, where components (e.g., volatile components or solvents, etc.) which are not included in the cured product of the final curing agent composition are not considered in the above calculation.

The curable composition may comprise other necessary components in addition to the above components.

For example, the curable composition may further comprise a catalyst, for example, an addition reaction catalyst. The type of catalyst is not particularly limited, but for example, a platinum-based catalyst may be used, where a known or commercially available one may be used as the platinum-based catalyst. The content of the catalyst is not particularly limited, where it may be included in a catalytic amount depending on the composition of the curable polyorganosiloxane component.

In addition to the above components, the curable composition may further comprise additional additives, for example, pigments or dyes, dispersants, thixotropic agents, flame retardants, and the like, if necessary.

As described above, the curable composition may be a one-component composition, a main or curing agent composition of a two-component composition, or a mixture of main and curing agent compositions of a two-component composition.

In the case of the one-component composition or the mixture of main and curing agent compositions of the two-component composition, the curable composition may comprise the aforementioned components at the same time.

In addition, when the curable composition is the main composition of the two-component composition, the main composition may comprise the alkenyl group-containing polyorganosiloxane component as the curable polyorganosiloxane component, and may further comprise the catalyst and filler components.

In addition, when the resin composition is the curing agent composition of the two-component composition, the curing agent composition may comprise, as the curable polyorganosiloxane component, the alkenyl group-containing polyorganosiloxane component and the silicon-bonded hydrogen-containing polyorganosiloxane component, may further comprise the filler component, and may comprise no catalyst. At this time, the fact of comprising no catalyst is that it is not substantially included, which means that it is not intentionally added, and in the case where it is included in an amount of about 0.01 wt % or less, 0.001 wt % or less, 0.0001 wt % or less, or 0.00001 wt % or less based on the total weight of the composition, it can be said that it is not substantially included.

In each of the above cases, specific types of polyorganosiloxane components, filler components, catalysts, etc. and their formulation ratios are as described above.

In one example, when the resin composition is a two-component curable composition, the resin composition comprises a main composition and a curing agent composition, which are physically separated, wherein the main composition may comprise an alkenyl group-containing polyorganosiloxane component and a filler component, and the curing agent composition may comprise an alkenyl group-containing polyorganosiloxane component, a silicon-bonded hydrogen-containing polyorganosiloxane component and a filler component.

In this case, the main composition may comprise a catalyst and the curing agent composition may comprise no catalyst.

In one example, in the two-component curable composition, the ratio (Ak1/Ak2) of the mole number (Ak1) of alkenyl groups of the alkenyl group-containing polyorganosiloxane component in the main composition to the mole number (Ak2) of alkenyl groups of the alkenyl group-containing polyorganosiloxane component in the curing agent composition may be in a range of 0.5 to 5. Specifically, the ratio (Ak1/Ak2) may be 0.7 or more, 0.8 or more, 0.9 or more, 1.0 or more, 1.1 or more, or 1.2 or more, or may be 4 or less, 3.5 or less, 3 or less, 2.5 or less, 2 or less, or 1.5 or less or so.

In one example, the ratio (H/Ak) of the total mole number (H) of silicon-bonded hydrogen atoms to the total mole number (Ak) of alkenyl groups in the two-component curable composition may exceed 1. Specifically, the ratio of the total mole number of silicon-bonded hydrogen atoms to the total mole number of all alkenyl groups may be 1.1 or more, 1.2 or more, 1.3 or more, 1.4 or more, 1.5 or more, 1.6 or more, 1.7 or more, 2 or more, 3 or more, 4 or more, or 5 or more. When the ratio of the mole number of silicon-bonded hydrogen atoms to the mole number of alkenyl groups is adjusted as in the above range, there is an advantage that the two-component curable composition can be stored for a long time without surface treatment of a filler. Here, the ratio of the total mole number of silicon-bonded hydrogen atoms to the total mole number of alkenyl groups in the two-component curable composition may be a ratio of the total mole number of silicon-bonded hydrogen atoms to the total mole number of alkenyl groups in the main composition and the curing agent composition.

In this case, specific types of polyorganosiloxane components, filler components, catalysts, etc. and their formulation ratios are the same as described above.

In one example, the viscosity value of the two-component curable composition may be about 1,000,000 cP or less. The lower limit may be, for example, about 2,000 cP or more. For example, the viscosity value of the two-component curable composition may be about 950,000 cP or less, 900,000 cP or less, or about 850,000 cP or less, and may be about 3,000 cP or more, 4,000 cP or more, or about 5,000 cP or more. When the corresponding range is satisfied, the long-term storage stability of the composition can be ensured and the appropriate processability can also be secured.

The two-component curable composition of the present application may have physical properties suitable for uses, which are described below, after curing.

In one example, the two-component curable composition may have a predetermined adhesive force at room temperature after curing. Specifically, the adhesive force to aluminum measured according to ASTM D1002 standard may be 3.8 kgf/$cm^2$ or more, 4.0 kgf/$cm^2$ or more, 4.2 kgf/$cm^2$ or more, 4.4 kgf/$cm^2$ or more, 4.6 kgf/$cm^2$ or more, 4.8 kgf/$cm^2$ or more, 5.0 kgf/$cm^2$ or more, 5.5 kgf/$cm^2$ or more, 6.0 kgf/$cm^2$ or more, or 6.5 kgf/$cm^2$ or more. The upper limit of the adhesive force is not particularly limited, which may be, for example, 10.0 kgf/$cm^2$ or less, 9.0 kgf/$cm^2$ or less, or 8.0 kgf/$cm^2$ or less. As described above, the two-component curable composition exhibiting excellent adhesive force to metal can be effectively used in various applications requiring heat dissipation materials.

In one example, the two-component curable composition may have predetermined hardness at room temperature after curing. At this time, it may be preferable that the cured layer of the composition exhibits appropriate hardness. For example, if the hardness of the cured layer is too high, the cured layer has brittle characteristics, so that it can adversely affect reliability. Considering this point, the hardness of the cured layer is adjusted, whereby impact resistance and vibration resistance can be secured and durability of the product can be secured. In the cured layer, for example, the hardness in the shore OO type may be 50 or more, 55 or more, 60 or more, 65 or more, or 70 or more, and may be 90 or less, 88 or less, 86 or less, 84 or less, or 82 or less. The hardness in the above range may be adjusted by the contents of the filler and the curing agent in the two-component curable composition.

In one example, the ratio ($H_0/H_{15}$) of hardness ($H_0$) immediately after preparation (0 day) of the two-component curable composition to hardness ($H_{15}$) when left at room temperature for the time of 15 days or more (15 days) may be 0.6 or more, 0.65 or more, 0.7 or more, 0.75 or more, or 0.8 or more. The hardness ($H_0$ and $H_{15}$) may be one in the shore OO type, and the ratio ($H_0/H_{15}$) may be adjusted by the contents of the filler and the curing agent in the two-component curable composition.

The two-component curable composition of the present application may be applied to various uses requiring heat dissipation materials, and the use scope is not particularly limited. For example, in a battery-related technology, the two-component curable composition may be applied as a heat dissipation material of a battery module or a battery pack, and the like or a heat dissipation material of an OBC (on-board charger) for a vehicle. Accordingly, the present application also relates to a battery module, battery pack, or on-board charger (OBC) including the two-component curable composition or a cured product thereof as a heat dissipation material. The application location or application method of the two-component curable composition or cured product in the battery module, battery pack or on-board charger is not particularly limited, and a known method may be applied. In addition, the two-component curable composition of the present application is not limited to the above uses, which can be effectively applied to various uses requiring excellent heat dissipation properties, storage stability and adhesive force.

In another example related to the present application, the present application may relate to electronic equipment or devices having the cured product of the two-component curable composition. The type of electronic equipment or device is not particularly limited, which may be exemplified by, for example, an AVN (audio video navigation) for a vehicle or an OBC (on-board charger) module for an electric vehicle, an LED module, or an IC chip and a computer or mobile device including the same.

The cured product of the two-component curable composition may radiate heat within the equipment or device, and may provide durability against impact and insulation, and the like.

Advantageous Effects

In the present application, it is possible to provide a curable composition in which a manufacturing process is simple, manufacturing cost is reduced, and long-term storage stability is ensured.

BRIEF DESCRIPTION OF DRAWINGS

The FIGURE is a graph showing the hardness changes according to the storage period of the cured product of the curable compositions of Examples 1 to 3 and Comparative Example 1.

BEST MODE

Hereinafter, the present application will be described in detail through Examples, but the scope of the present application is not limited by Examples below.

1. Hardness

The main compositions and the curing agent compositions prepared in Examples or Comparative Example were each put in a two-component cartridge; the main and curing agent compositions were mixed in a volume ratio of 1:1 and cured in the form of a film having a thickness of 5 mm or so; and then the hardness of the film surface was measured according to ASTM D 2240 standard. Upon the hardness measurement, an ASKER Durometer instrument was used. The initial hardness was measured by applying a load of about 1.5 kg or so to the surface of the sample in a flat state, and the hardness was evaluated by confirming the measurement value stabilized after 15 seconds. Shore 00 hardness was measured.

2. Thermal Conductivity

The main compositions and the curing agent compositions prepared in Examples or Comparative Example were each put in a two-component cartridge; the main and curing agent compositions were mixed in a volume ratio of 1:1 and cured in the form of a film having a thickness of 5 mm or so; and then the thermal conductivity of the film in the thickness direction was measured. The thermal conductivity was measured using a device in a method of measuring temperature changes while heating a sensor having a nickel wire double spiral structure as a hot disk measuring device according to the standard of ISO22007-2.

3. Viscosity

The viscosity of the main, curing agent or resin composition was measured using a viscoelasticity measuring device (Advanced Rheometic Expansion System; Brookfield, DV3T Rheometer, CPA-52Z spindle). The temperature condition was set to room temperature (about 25 °C), and the gap was set to 5 mm. The viscosity was measured while changing the shear rate from 0.1/s to 10.0/s. The viscosity as described below is a value at a shear rate of 1/s.

4. $^{1}H$ NMR Analysis

The $^{1}H$ NMR analysis of the polyorganosiloxane component was performed in a known manner. The analysis was performed at room temperature using an NMR spectrometer including a Varian Unity Inova (500 MHz) spectrometer with a triple resonance 5 mm probe. The analyte polyorganosiloxane component was diluted to a concentration of about 10 mg/ml or so in a solvent ($CDCl_3$) for NMR measurement and used, and the chemical shift was expressed in ppm.

5. $^{29}Si$ NMR Analysis

The $^{29}Si$ NMR analysis of the polyorganosiloxane component was performed in a known manner. Upon the $^{29}Si$ NMR analysis, the chemical shift was expressed using TMS (dilute tetramethylsilane in $CDCl_3$) as a reference compound.

6. GPC (Gel Permeation Chromatograph)

The number average molecular weight (Mn) and molecular weight distribution of the polyorganosiloxane component were measured using GPC (gel permeation chromatography). The analyte polyorganosiloxane is put in a 5 mL vial, and diluted in THF (tetrahydrofuran) to a concentration of about 5 mg/mL or so. Thereafter, the standard sample for calibration and the sample to be analyzed were filtered through a syringe filter (pore size: 0.45 μm) and then measured. As the analysis program, Agilent Technologies' ChemStation was used, and the weight average molecular weight (Mw) and number average molecular weight (Mn) were each obtained by comparing the elution times of the samples with the calibration curve, and the molecular weight distribution (PDI) was calculated by the ratio (Mw/Mn). The measurement conditions of GPC are as follows.

<GPC Measurement Conditions>

Instrument: 1200 series from Agilent Technologies

Column: Using 2 PLgel mixed B from Polymer Laboratories

Solvent: THF (tetrahydrofuran)

Column temperature: 40 °C.

Sample concentration: 5 mg/mL, 10 μL injection

Standard sample: Polystyrene (Mp: 3900000, 723000, 316500, 52200, 31400, 7200, 3940, 485)

Example 1

Preparation of Main Composition

In 10 g of a main part comprising 7.92 g of a polyorganosiloxane component (VP1000, Damipolychem) having a viscosity of 1000 cP and including a polyorganosiloxane of the following formula A, 1.98 g of a polyorganosiloxane component (DSVP100, Double S Solution) having a viscosity of 100 cP and including a polyorganosiloxane of the following formula B and 0.1 g of a platinum catalyst (1,3-divinyl-1,1,3,3-tetramethyl-disiloxane-platinum(0)-complex), aluminum hydroxide having a D50 particle diameter of about 50 μm or so and aluminum hydroxide having a D50 particle diameter of about 1 μm were mixed in a weight ratio of 7:3. The mixed aluminum hydroxide filler was included in an amount of 475 parts by weight relative to 100 parts by weight of the polyorganosiloxane components including the polyorganosiloxanes of Formulas A and B.

In the $^{1}H$-NMR analysis of the polyorganosiloxane component comprising the polyorganosiloxane of Formula A as measured in the above-described manner, the area ratio (Si—$CH_3$/Si-vinyl) of Si—$CH_3$ to Si-vinyl peak was about 252, and the content of vinyl groups identified on the basis of this was about 0.107 mmol/g. In the $^{1}H$-NMR analysis of the polyorganosiloxane component comprising the polyorganosiloxane of Formula B as measured in the above-described manner, the area ratio (Si—$CH_3$/Si-vinyl) of Si—$CH_3$ to Si-vinyl peak was about 93, and the content of vinyl groups identified on the basis of this was about 0.29 mmol/g.

The number average molecular weight (Mn) of the polyorganosiloxane component including the polyorganosiloxane of Formula A as measured by GPC was about 14800 g/mol; the weight average molecular weight (Mw) was about 35500 g/mol; and the molecular weight distribution (PDI=Mw/Mn) was about 2.40. The number average molecular weight (Mn) of the polyorganosiloxane component including the polyorganosiloxane of Formula B as measured by GPC was about 7020 g/mol; the weight average molecular weight (Mw) was about 13700 g/mol; and the molecular weight distribution (PDI=Mw/Mn) was about 1.95.

The components were introduced into a paste mixer, mixed at 600 rpm in revolution and 500 rpm in rotation for 3 minutes or so and dispersed, and then the main composition was prepared by identifying the generated heat and defoaming the mixture at 600 rpm in revolution and 200 rpm in rotation under a vacuum state for 4 minutes.

[Formula A]

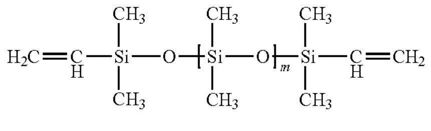

In Formula A, m is a number of 250 or so.

[Formula B]

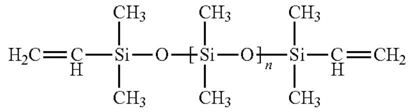

In Formula B, n is a number of 91 or so.

Preparation of Curing Agent Composition

In 10 g of a curing agent part comprising 6.12 g of the polyorganosiloxane component including the polyorganosiloxane of Formula A above, 1.53 g of the polyorganosiloxane component including the polyorganosiloxane of Formula B above, 0.35 g of a polyorganosiloxane component (XL11, AB Specialty Silicones) including a polyorganosiloxane of Formula C below and 2 g of a polyorganosiloxane component (CE4, AB Specialty Silicones) including a polyorganosiloxane of Formula D below, aluminum hydroxide having a D50 particle diameter of about 50 μm or so and aluminum hydroxide having a D50 particle diameter of about 1 μm were mixed in a weight ratio of 7:3. The mixed aluminum hydroxide filler was included in an amount of 614 parts by weight relative to 100 parts by weight of the polyorganosiloxane components including the polyorganosiloxanes of Formulas A and B, and included in an amount of 2000 parts by weight relative to 100 parts by weight of the polyorganosiloxane components including the polyorganosiloxanes of Formulas C and D.

As a result of performing the $^{29}Si$ NMR analysis performed on the polyorganosiloxane component including the polyorganosiloxane of Formula C, the molar ratio of M units ($(CH_3)_3SiO_{1/2}$ units) at both ends in the structure of Formula C was about 4.3 mol %, the molar ratio of D units $(CH_3)_2SiO_{2/2}$ units) without hydrogen was about 68.8 mol %, and the molar ratio of D units ($H(CH_3)SiO_{2/2}$ units) with hydrogen was about 26.9 mol %. In addition, the ratio (Si—$CH_3$/Si—H) of the Si—$CH_3$ peak to the Si—H peak as identified by $^1H$ NMR analysis was about 19.2, and the content of the silicon-bonded hydrogen identified through this was about 4.14 mmol/g.

In addition, the ratio (Si—$CH_3$/Si—H) of the Si—$CH_3$ peak to the Si—H peak as identified by $^1H$ NMR analysis performed on the polyorganosiloxane component including the polyorganosiloxane of Formula D was about 34.2, and the content of the silicon-bonded hydrogen identified through this was about 2.9 mmol/g.

The components were introduced into a paste mixer, mixed at 600 rpm in revolution and 500 rpm in rotation for 3 minutes or so and dispersed, and then the curing agent composition was prepared by identifying the generated heat and defoaming the mixture at 600 rpm in revolution and 200 rpm in rotation under a vacuum state for 4 minutes.

[Formula C]

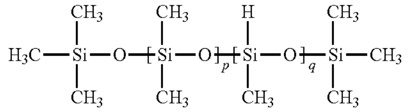

In Formula C, p is a number of 32 or so, and q is a number of 13 or so.

[Formula D]

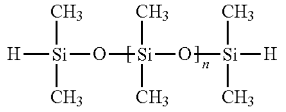

In Formula D, n is a number of 9 or so.

In each of the main composition and the curing agent composition, aluminum hydroxide was included in an amount of 65 vol % and the compositions were mixed such that the molar ratio (B/A) of the silicon-bonded hydrogen (B) of the curing agent composition to the alkenyl group (A) of the main composition and the curing agent composition was 2.88, thereby preparing a curable composition.

Example 2

Preparation of Main Composition

The main composition prepared in Example 1 above was used.

Preparation of Curing Agent Composition

A curable composition was prepared in the same manner as in Example 1 above, except that a curing agent part comprising 6.52 g of the polyorganosiloxane component including the polyorganosiloxane of Formula A above, 1.63 g of the polyorganosiloxane component including the polyorganosiloxane of Formula B above, 0.35 g of the polyorganosiloxane component (XL11, AB Specialty Silicones) including the polyorganosiloxane of Formula C above and 1.5 g of the polyorganosiloxane component (CE4, AB Specialty Silicones) including the polyorganosiloxane of Formula D above, which were used upon preparing the curing agent composition in Example 1 above, was prepared.

In each of the main composition and the curing agent composition, aluminum hydroxide was included in an amount of 65 vol % and the compositions were mixed such that the molar ratio (B/A) of the silicon-bonded hydrogen (B) of the curing agent composition to the alkenyl group (A) of the main composition and the curing agent composition was 1.72, thereby preparing a curable composition.

Example 3

Preparation of Main Composition

In 10 g of a main part comprising 9.98 g of the polyorganosiloxane component (VP1000, Damipolychem) including the polyorganosiloxane of Formula A and 0.02 g of the platinum catalyst (1,3-divinyl-1,1,3,3-tetramethyl-disiloxane-platinum(0)-complex), which were used upon preparing the main composition in Example 1 above, aluminum hydroxide having a D50 particle diameter of about 50 μm or so and aluminum hydroxide having a D50 particle diameter of about 1 μm were mixed in a weight ratio of 7:3. The mixed aluminum hydroxide filler was included in an amount of 301 parts by weight relative to 100 parts by weight of the polyorganosiloxane components including the polyorganosiloxanes of Formulas A and B.

Preparation of Curing Agent Composition

In 10 g of a curing agent part comprising 5 g of the polyorganosiloxane component including the polyorganosiloxane of Formula A, 1.67 g of the polyorganosiloxane component (XL11, AB Specialty Silicones) including the polyorganosiloxane of Formula C and 3.33 g of the polyorganosiloxane component (CE4, AB Specialty Silicones)

including the polyorganosiloxane of Formula D, which were used upon preparing the main composition in Example 1 above, aluminum hydroxide having a D50 particle diameter of about 50 μm or so and aluminum hydroxide having a D50 particle diameter of about 1 μm were mixed in a weight ratio of 7:3. The mixed aluminum hydroxide filler was included in an amount of 600 parts by weight relative to 100 parts by weight of the polyorganosiloxane components including the polyorganosiloxanes of Formulas C and D.

The components were introduced into a paste mixer, mixed at 600 rpm in revolution and 500 rpm in rotation for 3 minutes or so and dispersed, and then the curing agent composition was prepared by identifying the generated heat and defoaming the mixture at 600 rpm in revolution and 200 rpm in rotation under a vacuum state for 4 minutes.

In each of the main composition and the curing agent composition, aluminum hydroxide was included in an amount of 54 vol % and the compositions were mixed such that the molar ratio (B/A) of the silicon-bonded hydrogen (B) of the curing agent composition to the alkenyl group (A) of the main composition and the curing agent composition was 3.81, thereby preparing a curable composition.

Comparative Example 1

Preparation of Main Composition

In 10 g of a main part comprising 8.18 g of a polyorganosiloxane component (VP1000, Damipolychem) having a viscosity of 1000 cP and including a polyorganosiloxane of the following formula A, 1.67 g of a polyorganosiloxane component (DSVP100, Double S Solution) having a viscosity of 100 cP and including a polyorganosiloxane of the following formula B and 0.15 g of a platinum catalyst (1,3-divinyl-1,1,3,3-tetramethyl-disiloxane-platinum(0)-complex), aluminum hydroxide having a D50 particle diameter of about 50 μm or so and aluminum hydroxide having a D50 particle diameter of about 1 μm were mixed in a weight ratio of 7:3. The mixed aluminum hydroxide filler was included in an amount of 477 parts by weight relative to 100 parts by weight of the polyorganosiloxane components including the polyorganosiloxanes of Formulas A and B.

The components were introduced into a paste mixer, mixed at 600 rpm in revolution and 500 rpm in rotation for 3 minutes or so and dispersed, and then the main composition was prepared by identifying the generated heat and defoaming the mixture at 600 rpm in revolution and 200 rpm in rotation under a vacuum state for 4 minutes.

[Formula A]

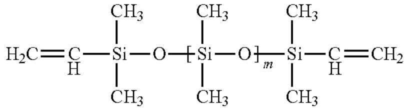

In Formula A, m is a number of 250 or so.

[Formula B]

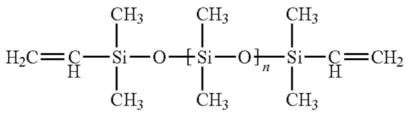

In Formula B, n is a number of 91 or so.

Preparation of Curing Agent Composition

In 10 g of a curing agent part comprising, in 7.96 g of the polyorganosiloxane component including the polyorganosiloxane of Formula A above and 1.67 g of the polyorganosiloxane component including the polyorganosiloxane of Formula B above, 0.37 g of a polyorganosiloxane component (FD5020, Damipolychem) including a polyorganosiloxane of Formula C below, aluminum hydroxide having a D50 particle diameter of about 50 μm or so and aluminum hydroxide having a D50 particle diameter of about 1 μm were mixed to have a ratio of 7:3 by weight. The mixed aluminum hydroxide filler was included in an amount of 488 parts by weight relative to 100 parts by weight of the polyorganosiloxane components including the polyorganosiloxanes of Formulas A and B, and included in an amount of 12,703 parts by weight relative to 100 parts by weight of the polyorganosiloxane component including the polyorganosiloxane of Formula C.

The components were introduced into a paste mixer, mixed at 600 rpm in revolution and 500 rpm in rotation for 3 minutes or so and dispersed, and then the curing agent composition was prepared by identifying the generated heat and defoaming the mixture at 600 rpm in revolution and 200 rpm in rotation under a vacuum state for 4 minutes.

[Formula C]

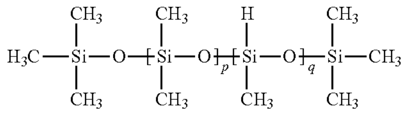

In Formula C, p is a number of 39 or so, and q is a number of 8 or so.

In each of the main composition and the curing agent composition, aluminum hydroxide was included in an amount of 65 vol % and the compositions were mixed such that the molar ratio (B/A) of the silicon-bonded hydrogen (B) of the curing agent composition to the alkenyl group (A) of the main composition and the curing agent composition was 0.4, thereby preparing a curable composition.

For storage stability evaluation, the thermal conductivity and hardness of the curable composition of Comparative Example 1 were evaluated immediately after preparation (Od), after 3 days (3 d), after 9 days (9 d) and after 15 days (15 d), and summarized in Table 1 below. In addition, the thermal conductivity and hardness were summarized in Table 1 immediately after the preparation of the curable compositions of Examples 1 to 3 and after time has elapsed.

TABLE 1

| | Storage period of curable composition (25 °C) | Thermal conductivity (W/mK) | Hardness (Shore 00) |
|---|---|---|---|
| Comparative Example 1 | 0 d | 1.86 | 60 |
| | 3 d | 1.82 | 50 |
| | 9 d | 1.87 | 46 |
| | 15 d | 1.85 | 39 |
| Example 1 | 0 d | 1.87 | 74 |
| | 4 d | 1.89 | 69 |
| | 10 d | 1.84 | 63 |
| | 17 d | 1.87 | 60 |
| Example 2 | 0 d | 1.88 | 81 |
| | 5 d | 1.90 | 79 |
| | 12 d | — | 79 |
| | 19 d | 1.87 | 75 |

TABLE 1-continued

| | Storage period of curable composition (25 °C) | Thermal conductivity (W/mK) | Hardness (Shore 00) |
|---|---|---|---|
| Example 3 | 0 d | 1.22 | 78 |
| | 7 d | 1.26 | 82 |
| | 14 d | 1.24 | 74 |
| | 21 d | 1.17 | 78 |

Referring to the FIGURE and Table 1, it can be confirmed that the hardness of the curable composition of Comparative Example 1 has been decreased by 20 or more within 10 days after preparation, but the curable compositions of Examples 1 to 3 composition have a small degree of decrease in hardness over time, while exhibiting appropriate thermal conductivity, thereby ensuring storage stability.

The invention claimed is:

1. A two-component curable composition comprising a main composition and a curing agent composition, wherein the main composition comprises a first alkenyl group-containing polyorganosiloxane component and a first filler, and the first filler is an inorganic hydroxide filler, and the curing agent composition comprises a second alkenyl group-containing polyorganosiloxane component, a silicon-bonded hydrogen-containing polyorganosiloxane component and a second filler component having a second filler, and the second filler is an inorganic hydroxide filler, wherein the second filler component has a volume ratio of 50 to 75 vol % based on the total volume of the two-component curable composition, an alkenyl group content of the second alkenyl group-containing polyorganosiloxane component is in a range of 0.05 to 5 mmol/g, a ratio (H/Ak) of mole number (H) of silicon-bonded hydrogens contained in the silicon-bonded hydrogen-containing polyorganosiloxane component to mole number (Ak) of alkenyl groups contained in the first alkenyl group-containing polyorganosiloxane component and the second alkenyl group-containing polyorganosiloxane component is in a range of more than 1 to 10, the silicon-bonded hydrogen-containing polyorganosiloxane component comprises a first polyorganosiloxane component having a compound of Formula 2, and a second polyorganosiloxane component having a compound of Formula 3:

[Formula 2]

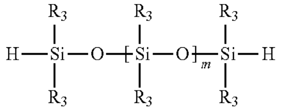

wherein, $R_3$ is an alkyl group, and m is a number in a range of 7 to 25:

[Formula 3]

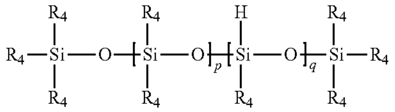

wherein, $R_4$ is an alkyl group, p is a number in a range of 20 to 60, and q is a number in a range of 9 to 20, and a ratio (H1/H2) of mole number (H1) of silicon-bonded hydrogens in the first polyorganosiloxane component to mole number (H2) of silicon-bonded hydrogens in the second polyorganosiloxane component is in a range of 1.5 to 10.

2. The two-component curable composition according to claim 1, wherein a ratio (Ak1/Ak2) of mole number (Ak1) of alkenyl groups contained in the first alkenyl group-containing polyorganosiloxane component to mole number (Ak2) of alkenyl groups contained in the second alkenyl group-containing polyorganosiloxane component is in a range of 0.5 to 5.

3. The two-component curable composition according to claim 1, wherein the main composition further comprises a catalyst.

4. The two-component curable composition according to claim 1, wherein the ratio (H/Ak) of mole number (H) of silicon-bonded hydrogens contained in the silicon-bonded hydrogen-containing polyorganosiloxane component to mole number (Ak) of alkenyl groups contained in the first alkenyl group-containing polyorganosiloxane component and the second alkenyl group-containing polyorganosiloxane is in a range of 2 to 10.

5. The two-component curable composition according to claim 1, wherein the second alkenyl group-containing polyorganosiloxane component has a polyorganosiloxane represented by Formula 1:

[Formula 1]

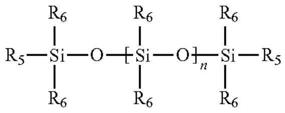

wherein, $R_5$ is an alkenyl group, $R_6$ is an alkyl group, and n is a number in a range of 30 to 300.

6. The two-component curable composition according to claim 1, wherein a content of silicon-bonded hydrogens in the first polyorganosiloxane component is in a range of 0.5 to 10 mmol/g, and a content of silicon-bonded hydrogens in the second polyorganosiloxane component is in a range of 0.5 to 6 mmol/g.

7. The two-component curable composition according to claim 1, wherein a ratio of the second filler component is in a range of 300 to 900 parts by weight relative to 100 parts by weight of the second alkenyl group-containing polyorganosiloxane component.

8. The two-component curable composition according to claim 1, wherein a ratio of the second filler component is in a range of 1,000 to 30,000 parts by weight relative to 100 parts by weight of the silicon-bonded hydrogen-containing polyorganosiloxane component.

9. The two-component curable composition according to claim 1, wherein the curing agent composition comprises no catalyst.

10. The two-component curable composition according to claim 1, wherein the second filler component comprises a first inorganic hydroxide filler having an average particle diameter of 20 μm or more and a second inorganic hydroxide filler having an average particle diameter of 10 μm or less.

11. The two-component curable composition according to claim 10, wherein a ratio (D1/D2) of average particle diameter (D1) of the first inorganic hydroxide filler to the average particle diameter (D2) of the second inorganic hydroxide filler is in a range of 2 to 200.

12. The two-component curable composition according to claim 10, wherein a ratio (W1/W2) of weight (W1) of the first inorganic hydroxide filler to weight (W2) of the second inorganic hydroxide filler is in a range of 0.5 to 10.

* * * * *